July 23, 1940.   H. DAVIS   2,209,075
FURNACE TEMPERATURE CONTROL
Filed Nov. 27, 1935   2 Sheets-Sheet 1

Inventor
Harry Davis
By R. S. C. Dougherty,
Attorney

July 23, 1940. H. DAVIS 2,209,075
FURNACE TEMPERATURE CONTROL
Filed Nov. 27, 1935 2 Sheets-Sheet 2
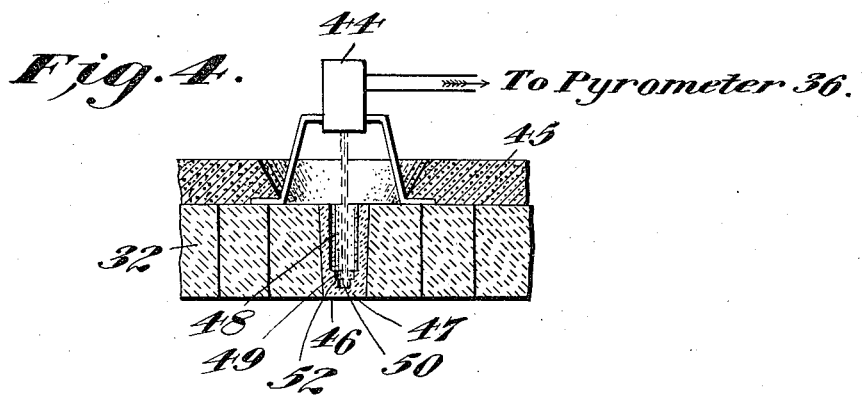
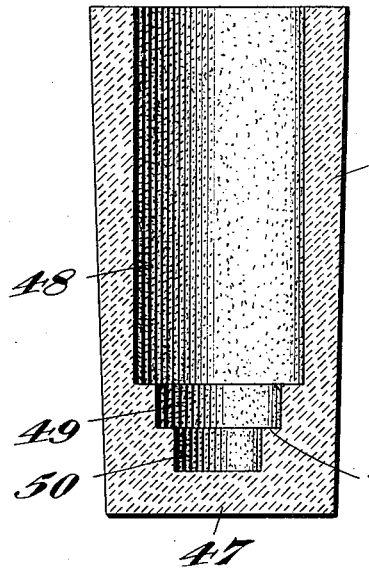
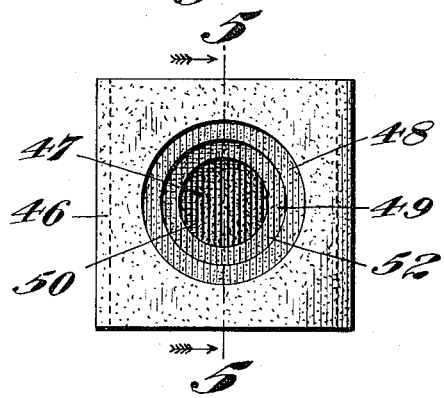
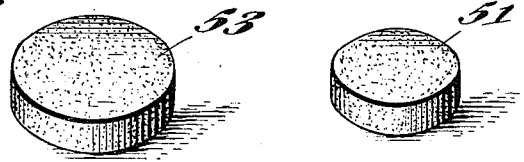
Inventors
Harry Davis
By P. S. C. Dougherty
Attorney Patented July 23, 1940

2,209,075

UNITED STATES PATENT OFFICE 2,209,075

FURNACE TEMPERATURE CONTROL

Harry Davis, Bethlehem, Pa., assignor to Bethlehem Steel Company, a corporation of Pennsylvania Application November 27, 1935, Serial No. 51,809

1 Claim. (Cl. 136—4)

This invention relates to a method of and means for controlling high temperature furnaces; and more particularly to a method and means whereby the temperature of an open hearth furnace is automatically controlled by and in accordance with changes in the temperature of the roof of the furnace, so as to prevent the temperature from rising above the melting point of the refractories forming the roof of the furnace.

This application is a continuation-in-part of prior application, Serial No. 697,894, filed Nov. 14, 1933, now abandoned.

Heretofore in open hearth furnaces, in order to prevent overheating of the roof, it was necessary to watch closely the condition of the underside of the roof and make changes in the input of heating medium accordingly. By this method, serious damage by overheating has frequently occurred to the roof through inadvertence or neglect on the part of the furnace attendant.

With the melting point of present roof refractories so close to the working temperature of modern metallurgical furnaces, especially of the open hearth type, the necessity for some method of protecting the roof has become increasingly imperative, and with this condition in mind I have devised a method and means to permit a maximum rate of melting without the attendant danger of burning the roof due to variation in the transfer of heat, due in turn to the changing conditions in the furnace.

It is a recognized fact that the roof of an open hearth furnace is subject to very high temperatures, and that the campaign of the furnace depends to a great extent upon the life of the refractories forming the roof. Therefore, if the life of the roof can be extended by preventing overheating and burning, then, a greater number of heats can be taken from the furnace before a general rebuilding is required.

The practice of insulating furnaces on the outside is another factor in favor of automatic temperature control because insulation prevents heat conduction and causes higher temperatures in the furnace. An insulated furnace will not cool down as quickly as an uninsulated furnace, thereby the greater danger of burning the refractories.

A well insulated wall or roof will be more severely damaged by a certain period of overheating above its fusing point at the inside of the furnace. The feasibility of insulation thus closely depends upon the accuracy of control of furnace temperatures, and of course this control becomes more and more important as furnace temperatures approach closer to the softening range of the refractories used in the furnace construction.

To provide protection to the roof of an open hearth furnace, I effect automatic regulation of the heating medium so as to either decrease or shut off the supply of said medium when the temperature of the roof refractories has reached a predetermined temperature by means of a heat responsive device protectively embedded in or positioned above the roof, and connecting the device to suitable control means for regulating the supply of fuel to the furnace. After the temperature of the roof has dropped to a safe working heat the fuel supply is again automatically increased. By this method of control the human element is eliminated; the life of the roof greatly increased; and the cost of production decreased accordingly.

Fig. 4 shows a modified adaptation of a radiation pyrometer positioned above the roof of the furnace.

Fig. 5 is a sectional view taken on lines 5—5 of Fig. 6 of the refractory brick used in combination with the radiation pyrometer.

Fig. 6 is a plan view of the brick shown in Fig. 5.

Figs. 7 and 8 show thin refractory discs for use with the brick shown in Fig. 5.

Figure 1:
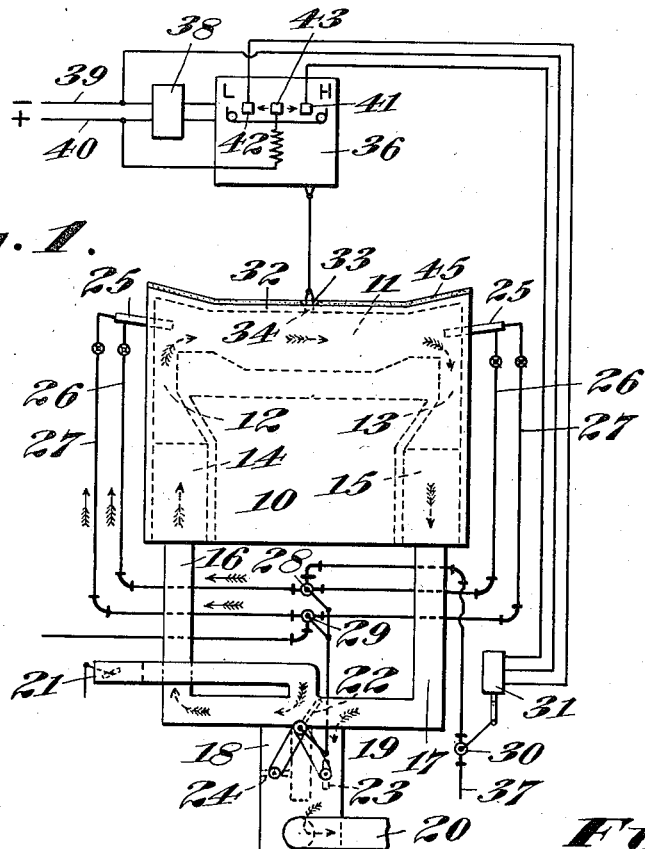
Fig. 1 is a diagrammatic view of a liquid fuel open hearth furnace, and devices used in the control of the furnace in accordance with my invention.

Referring to Fig. 1 which shows, as a means of illustration, my system of control as applied to an oil or tar burning open hearth furnace. The furnace 10 may be of the usual construction for this method of heating, having a hearth or heating chamber 11, air uptakes 12 and 13, and the usual checkers 14 and 15. The ducts 16 and 17 communicate with the checkers and with ducts 18 and 19 which lead to the flue 20. The air intake 21 may communicate with either of the ducts 16 or 17 and is provided with a reversing valve 22. Ducts 18 and 19 are also provided with reversing valves 23 and 24.

The burners 25 are each fitted with a fuel line 26 and a steam or air line 27 which connect with the reversing valves 28 and 29. Fuel to the burners is controlled by valve 30 by means of the electric actuator 31.

For the purpose of protecting the roof 32 of the furnace from abnormal and destructive heat, I install a suitable thermo-couple 33 or its equivalent in the roof at one or more points. These couples may be placed in any part of the roof, and either where the heat is greatest or where the refractories are subject to severe cutting effect of the flame. Platinum couples are used, but any other suitable type of pyrometer may be employed.

Figures 2, 3:
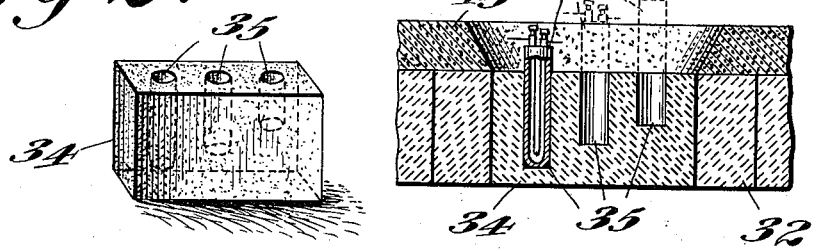
Fig. 2 is a perspective view of a refractory roof brick having holes adapted to receive a thermocouple.
Fig. 3 is a sectional view of the brick with the couple in position in an insulated roof.

Figs. 2 and 3 show a refractory brick 34 having a plurality of holes 35 of varying depths. The bottom of the deepest hole terminates at approximately two inches from the bottom surface of the brick. As the bottom of the brick deteriorates, the couple can be removed and placed in a hole of lesser depth so that the couple may be protected from the direct heat of the furnace at all times and thereby indicate the absolute heat of the roof and not its relative heat as would be the case if the couple were in direct communication with the heat from within the furnace. The brick may be made of carborundum or any type of refractory which has a fusion point sufficiently high to withstand the temperatures encountered in the operation of an open hearth furnace. Any hole which may be burned through from its under side can be plugged with suitable refractory material from the top of the roof when changing the couple to another hole. A brick formed after this manner has a distinct advantage over a brick with but a single hole of maximum depth and where such a brick would have to be taken out and replaced as a whole due to its normal deterioration, or where separate bricks are used each having a single hole and each hole varying in depth.

Carborundum is especially adapted for this purpose because of its high heat resisting and rapid conductive properties.

The thermo-couple 33 is electrically connected to a pyrometer 36, either indicating or recording. The pyrometer in turn is electrically connected to the two-way electric actuator 31 of suitable design for effecting actuation of the fuel valve 30 inserted in the fuel supply line 37. Electrical energy is supplied to a motor operating the pyrometer through the transformer 38. The actuator 31 receives its power from wires 39 and 40.

The pyrometer used is of a well-known type which has high (H) and low (L) contacts 41 and 42 respectively, and a traveling contact 43. The contacts 41 and 42 are adjustably mounted so as to be able to set them at positions corresponding to the temperature at which it is desired to reduce and to increase the supply of heating medium when contact 43 is brought into contact with one or the other contacts.

With the furnace working properly and at the desired heat, the pyrometer 36 is set to respond to the electrical potential of the thermo-couple, the magnitude of which is determined by the predetermined high and low temperatures of the roof at which it is desired to actuate the fuel control. When the temperature of the roof reaches 2900° F. (approximately 150° F. below the melting point of silica brick) the pyrometer makes contact with the high temperature contact H thus completing the electrical circuit to the electric actuator 31 for regulating the fuel control valve 30, thereby reducing the supply of fuel to the furnace. This condition exists until the temperature of the roof drops to about 2850° F., when contact is made with the low temperature contact L which again increases the fuel supply.

With reference to Fig. 4, here is indicated a radiation pyrometer 44 positioned above the roof of a furnace. Insulation over the roof is indicated at 45. In the roof is placed a rectangular carborundum brick 46 as shown in Fig. 5. This brick is of special construction so as to form an initial barrier 47 at its bottom side between the direct heat inside the furnace and the pyrometer. The brick is provided with a series of differently sized holes 48, 49 and 50 which finally terminate about an inch from the bottom face of the brick.

As the roof and the brick burns away in the natural manner the bottom portion of the brick is burned through. It is then that the smaller carborundum disc 51 is inserted into the second larger hole 49. When the shoulder 52 is burned away this disc 51 drops out of the brick and the larger carborundum disc 53 is inserted into the largest hole 48 so as to continuously provide a new bottom for the brick as it burns away. The pyrometer 44 is focused on the top of the barrier or disc in the bottom of the roof brick. The temperature indicated at any moment by the pyrometer is checked by sighting through a furnace door by means of an optical pyrometer, thus determining the actual temperature of the underside of the roof. Temperature changes are transmitted sufficiently fast through the thin disc in the bottom of the brick to make the temperatures as indicated by the radiation pyrometer truly representative of the temperature of the inside of the roof except for a slight time lag necessary for a change in temperature to be transmitted through the original bottom of the brick or through a disc. The temperature recorder 36 is so equipped that the temperature actually indicated by the radiation pyrometer 44 can be set to correspond exactly with the temperature indicated by the optical pyrometer, thus making a correction for the constant differential that exists between the bottom and top faces of the disc or barrier. This temperature differential is checked daily to insure that the temperatures shown are correct. This method of checking temperature also applies to the brick shown in Figs. 2 and 3. It will be obvious that the radiation pyrometer may be used in combination with brick 34 as well as with brick 46.

From the foregoing description of my system of control it will be obvious that the input of heating medium to the furnace is regulated relatively to the heat resisting and heat conducting qualities of the roof bricks 34 or 46, and that the supply of heating medium is controlled by a function of the heat absorbed by the bricks. Also, the heat of the furnace is controlled indirectly, by and in accordance with the actual heated condition of the roof surrounding the bricks and not through a direct function of the temperature inside the furnace.

The advantages of my invention will be apparent to those having to deal with open hearth furnaces, because it has always been a troublesome problem to work a furnace to its maximum capacity and at the same time to guard against the dangers of overheating and burning the roof of the furnace. With my method of control a furnace may be worked to its maximum efficiency without fear of overheating because the actual temperature of the roof is used as a final and positive controlling agent for preventing and eliminating this danger, thus allowing maximum production of the furnace and at the same time extending the useful life of the roof, and thereby reducing the cost of the refractories, and their replacement.

While I have shown my invention applied in two forms, it will be obvious to those skilled in the art that it is not so limited, but is susceptible of various changes and modifications without departing from the spirit thereof, and I desire, therefore, that only such limitations shall be placed thereupon as are imposed by the prior art, or as, are specifically set forth in the appended claim.

Having thus described my invention what I claim as new and desire to secure by Letters Patent is:

In an apparatus for measuring the temperature of a refractory wall structure, a refractory block for inclusion as a portion of said wall structure and provided with a plurality of external recesses of progressively increasing depth.

HARRY DAVIS.